3,010,923
CHEMICAL COMPOUNDS
Carol K. Ikeda, Wallingford, Pa., assignor to E. I. du Pont de Nemours and Company, Wilmington, Del., a corporation of Delaware
No Drawing. Filed May 26, 1958, Ser. No. 737,506
21 Claims. (Cl. 260—23)

This application is a continuation-in-part of my copending application Serial No. 730,070 filed April 22, 1958, which in turn is a continuation-in-part of my copending application Serial No. 683,021 filed September 10, 1957.

This invention relates to a new class of chemical compounds and more particularly to chemical compounds containing a plurality of radicals having the following structural formula:

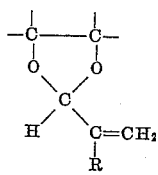

in which 3 of the 4 remaining valences are satisfied by monovalent radicals of the class consisting of hydrogen, alkyl, aryl, alkaryl, chloroalkyl, fluoroalkyl, alkoxyalkyl, chloroalkoxyalkyl, fluoroalkoxyalkyl, cyanoalkoxyalkyl, cyanoalkyl, and alkenyl, and R is a monovalent radical of the class consisting of hydrogen, alkyl, chloro, fluoro, cyano, acyloxy, chloroalkyl, fluoroalkyl, cyanoalkyl, alkoxy, and carbalkoxy. The unsatisfied valence of one of the carbon atoms is the valance through which the cyclic radical is connected to at least one other such radical by means of a polyvalent connecting radical.

The invention also relates to coating compositions containing these new compounds.

I have found that these new compounds have the unexpected and unique property of polymerizing and becoming insoluble in liquids which are solvents for the starting compounds when such compounds are exposed to oxygen. This property distinguishes these new compounds from other vinyl-containing compounds the polymerization of which is inhibited by oxygen. This insolubilization is brought about most quickly and effectively in the presence of a small proportion of the kind of siccative metal compounds used as paint driers.

Analyses by chemical and infrared absorption techniques indicate that this property evolves as a result of a new and unique mechanism in which oxygen is absorbed, acrylic ester and hydroxyl structures progressively appear, and the cyclic acetal structure and vinyl unsaturation progressively disappear as the insolubilization proceeds.

The characteristic common to all of these new compounds is the presence of a plurality of the radicals for which the structural formula is shown above. This radical is referred to herein for the sake of brevity as the 2-vinyl-1,3-dioxolane radical, or simply the vinyl dioxolane radical, it being understood that a substitutent other than hydrogen can be attached to the alpha carbon atom of the vinyl radical as indicated.

For reasons of economy, ease of operation and availability of suitable starting materials, the preferred number of 2-vinyl-1,3-dioxolane radicals in a given compound is 2 to 4, although higher numbers can be made. For example, six of such radicals can be attached to a hexavalent radical derived from mellitic acid. Obviously mixtures of compounds can yield compositions in which the overall average number of vinyl dioxolane radicals per molecule is not a whole number.

From the standpoint of rapid air-drying or insolubilization in the presence of oxygen, the preferred new compounds are those in which the vinyl dioxolane equivalent does not exceed about 500; in other words, the weight of compound required to provide one gram mole of dioxolane radical does not exceed about 500 grams.

The polyvalent connecting radical which joins a plurality of the vinyl dioxolane radicals is not critical. However, it will be obvious to persons skilled in the polymerization art that substituents known to have an inhibiting effect on vinyl polymerization should be avoided or placed in a shielded or sterically hindered position so that the inhibiting effect is minimized. Likewise strongly acidic radicals which tend to open the dioxolane ring, and radicals which form insoluble complexes with metallic driers, are preferably avoided. Such obvious precautions yield compounds which offer the maximum advantages of this invention.

Examples of suitable connecting radicals are:

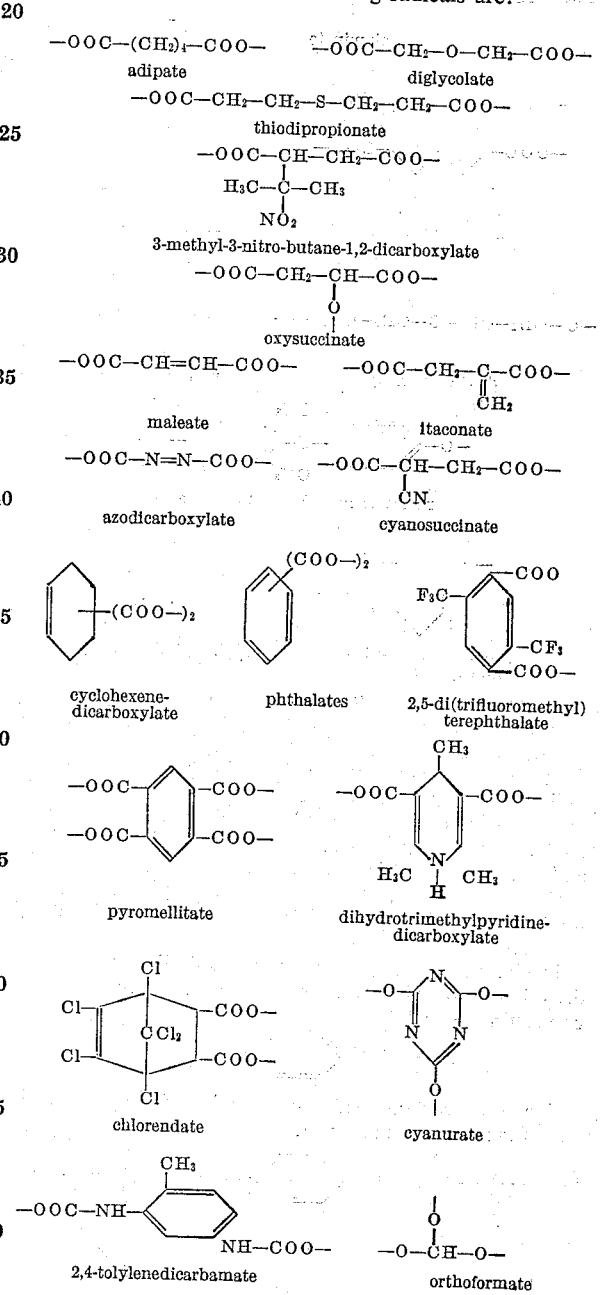

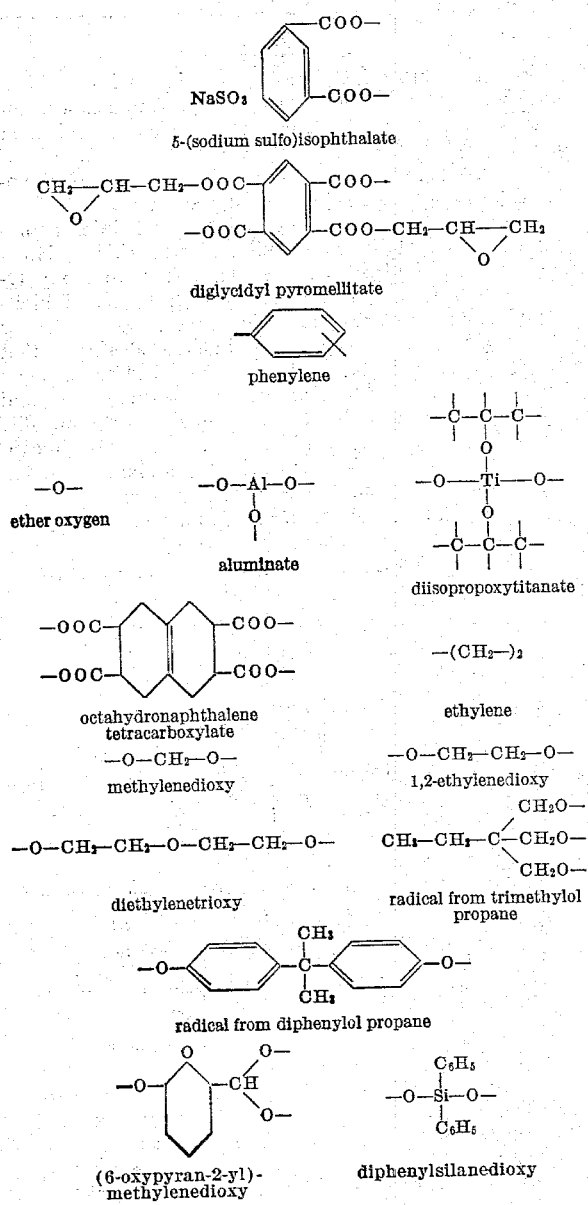

Other connecting radicals are apparent from the nature of those given above and still others will become apparent as the description of the invention proceeds.

In addition to compounds containing vinyl dioxolane radicals and connecting radicals as illustrated above, this invention includes compounds containing bivalent intermediate or bridging radicals between the dioxolane rings and the polyvalent connecting radical. Such bridging radicals usually enter the system as substituents in the polyhydroxy starting materials from which the dioxolane rings evolve.

In the case of the terephthalic acid diester of 4-hydroxybutyl-2-vinyl-1,3-dioxolane, there is a terephthalate connecting radical

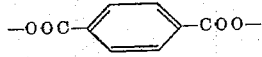

and a hydrocarbon bridging radical —(CH₂)₄— at each end of the connecting radical:

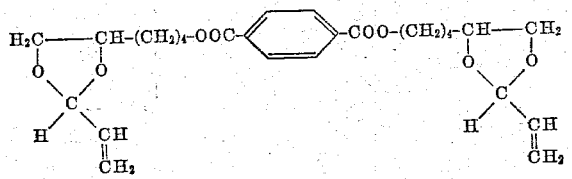

In the immediately foregoing illustration, a divalent connecting radical is used for simplicity, but it is to be understood that the principle illustrated pertains also to trivalent and higher polyvalent connecting radicals. Further for the purpose of simplicity, hydrogen atoms satisfy all of the valences of the first-given structural formula of this specification except that one valence required to connect the ring to the remainder of the compound. It is to be understood that the substituents can be other than hydrogen as previously described.

Examples of suitable bivalent bridging radicals are:

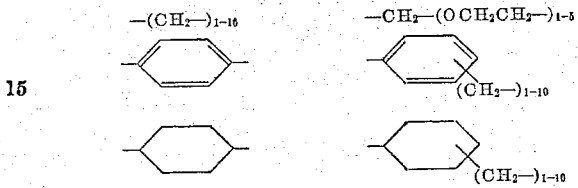

In the vinyl dioxolane radical common to all of the compounds of this invention, there appears as a substituent on the number 2 carbon atom the group

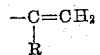

in which R is H, alkyl, chloro, fluoro, cyano, acyloxy, chloroalkyl, fluoroalkyl, cyanoalkyl alkoxy, or carbalkoxy. Examples of suitable R groups other than hydrogen are methyl, ethyl, propyl, butyl, chloro, fluoro, cyano, acetoxy, butyroxy, benzoyl, chloromethyl, fluoroethyl, cyanoethyl, methoxy, butoxy, carbomethoxy, and carbethoxy. A convenient source of such a radical for this position is acrolein or an appropriate alpha-substituted acrolein which, under the conditions used here, condenses with a polyhydroxy compound in typical aldehyde or ketone fashion:

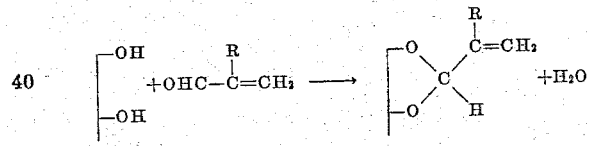

In some cases it is easier to generate the

substituent in the number 2 position of a preformed dioxolane ring than it is to obtain the corresponding alpha-substituted acrolein for condensation with a polyhydroxy compound in the manner described directly above. For example an intermediate having the structural formula

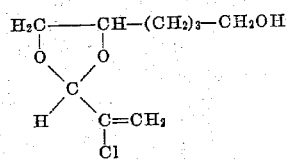

is prepared by dehydrochlorinating a dioxolane, having a structural formula as follows, prepared by condensing 2,3-dichloropropionaldehyde and 1,2,6-hexanetriol

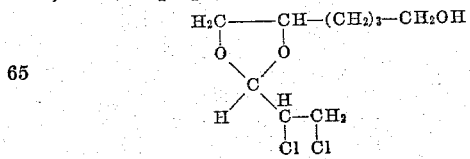

Esters being a preferred form of the new compounds of this invention, the method of preparing them will sreve as a guide to the preparation of other forms by analogous reactions.

I believe the most convenient method is, first, to prepare a 4-hydroxy-alkyl-2-vinyl-1,3-dioxolane by condensing acrolein, or an alpha-substituted acrolein in which the substituent is the R prescribed in the structural formula set forth above, with a triol such as glycerine or 1,2,6-hexanetriol under closely controlled acidic conditions. A preferred process for accomplishing this is disclosed and claimed in the copending application of Armand Edward Brachman Serial No. 728,546 filed April 15, 1958.

Then the desired ester is prepared by reacting the product of the first step with a lower alkyl ester of the desired polycarboxylic acid under ester interchange conditions while removing the lower alkanol by-product.

Other methods of preparing the esters include (1) reacting the 4-hydroxy-alkyl-2-vinyl-1,3-dioxolane with the acid chloride of the desired polycarboxylic acid under basic conditions, and (2) reacting a 4-acetoxyalkyl-2-vinyl-1,3-dioxolane with the desired polycarboxylic acid or a lower alkyl ester thereof under esterification or ester interchange conditions while removing acetic acid or alkyl acetate.

Still another method is, first, to prepare a 4-haloalkyl-2-vinyl-1,3-dioxolane by condensing acrolein or a substituted acrolein as described above with an epihalohydrin and, second, to prepare the desired ester by reacting the product of the first step with a salt of the desired polybasic acid.

Considering a convenient and preferred method in more detail, a 4-hydroxyalkyl-2-vinyl-1,3-dioxolane is prepared by condensing substantially equimolar proportions of acrolein and an alpha, beta, omega alkane triol such as 1,2,6 hexanetriol under mild acid conditions, e.g. in the presence of a catalytic amount of a mildly acidic compound such as ammonium chloride or an acid having a low dissociation constant, such as oxalic acid or phosphoric acid. Strong acids alone tend to promote sidereactions, to lower yield and to cause gelation. The reaction is preferably carried out in a solvent having the property of forming a binary with water, such as hexane, toluene, benzene, ether, methylene chloride, the solvent being present in an amount which permits distillation and removal of the water of reaction from the charge at a moderate temperature, e.g. less than 130° C and preferably 50°–110° C. Higher temperatures tend to reduce reaction time but promote an undesirable sidereaction presumably involving the addition of a hydroxyl group of the triol across the double bond of the acrolein. Lower temperatures tend to minimize this side-reaction but also slow down the desired reaction. The preferred range of 50°–110° C usually provides the maximum yield for a convenient reaction period, not exceeding about 24 hours, during which substantially all of the water of reaction is removed. A vinyl polymerization inhibitor such as hydroquinone or t-butyl catechol is preferably present. The resulting crude product can be used directly in the succeeding esterification, but purification by conventional procedures such as washing and/or fractionation is usually desirable.

In converting the resulting 4-hydroxyalkyl-2-vinyl-1,3-dioxolane to a polycarboxylic acid ester, direct esterification with the acid or an anhydride thereof is preferably avoided due to a tendency toward opening the dioxolane ring. It is preferred to introduce the acid moiety in a substantially chemically equivalent amount as an alkyl ester (e.g. methyl, butyl, lauryl) and to force the reaction to completion by distilling off the corresponding alcohol. This is preferably done under basic ester-interchange conditions, e.g. in the presence of a catalytic amount of a basic catalyst such as an oxide, hydroxide, carbonate or alkoxide of an alkali or alkaline earth metal. Useful products can be made by using substantially more than a chemically equivalent proportion of either reactant, or by using a mixture of mono- and polycarboxylic acid moieties, whereby a mixture of esters is obtained, provided a substantial proportion thereof is an ester containing a plurality of vinyl dioxolane groups corresponding to the previously described general formula. The reaction is most conveniently carried out in the presence of a solvent which forms a binary with the alcohol by-product, such as toluene or benzene, whereby the alcohol can be removed by distillation. Any temperature between the boiling point of the binary and the decomposition temperature of the components of the charge can be used, but a preferred range is 50°–225° C. The reaction is considered complete when the vapor temperature is substantially above the boiling point of the binary. This usually requires not more than 6 hours. If a product free of solvent is desired, the solvent can be distilled off, preferably under vacuum. If a vinyl polymerization inhibitor is present, it should be removed for best results in end uses involving the previously described insolubilization by polymerization. For example, hydroquinone can be removed with a sodium hydroxide wash. The product is useful without further purification as a coating material, for example, or as a film-forming component of mixed coating compositions, but if higher purity is desired, the product can be fractionated or purified by well known techniques.

In preparing the vinyl dioxolane esters of this invention, it is particularly preferred to carry out the esterification reaction in the presence of an alkyl orthotitanate. Such orthotitanates favor the desired reaction. For example, in the ester interchange of hydroxyalkyl-2-vinyl-1,3-dioxolanes with compounds such as diethyl acetone dicarboxylate, diethyl dicyanomalonate, and unsaturated acid esters such as diethyl maleate and diethyl itaconate, carrying out the reaction in the presence of an alkyl orthotitanate greatly reduces by-product impurities and increases yields. 1 to 6 carbon atom alkyl orthotitanates, that is, titanates having the formula $Ti(OR)_4$ wherein R represents an alkyl radical of from 1 to 6 carbon atoms and particularly tetra isopropyl titanate are preferred because they do not have an appreciable vapor pressure, yet under the reaction conditions, are readily distillable. Although the amount of orthotitanate is not critical, from 5 to 20 parts by weight per mole of the dioxolane are preferred.

Examples of polycarboxylic acids which are suitable for preparing the esters of this invention are:

Dicarboxylic acids: malonic, succinic, glutaric; 1,1-propanedicarboxylic, adipic, pimelic, suberic, azelaic, sebacic, dimerized vegetable oil acids (predominantly dimers of unsaturated $C_{18}$ fatty acids), maleic, fumaric, acetylene dicarboxylic, itaconic; ortho-, iso- and terephthalic acids and their di-, tetra- and hexahydro derivatives; cyclopentane dicarboxylic cyclopropane dicarboxylic, camphoric, naphthalene dicarboxylic, hydrogenated naphthalene dicarboxylic acids, dicyclopentadiene dicarboxylic, 3,6-endomethylenetetrahydrophthalic, diglycolic, thiodipropionic, cyclohexene dicarboxylic, dihydrotrimethylpyridine dicarboxylic, chlorendic (hexachloro-endomethylenetetrahydrophthalic), acetone dicarboxylic, acetamidomalonic, bis(cyanoethyl) malonic, azodicarboxylic, cyanosuccinic, 3-methyl-3-nitro-butane-1,2-dicarboxylic, citraconic.

Tricarboxylic acids: tricarballylic, aconitic; 1,2,3-cyclopropane tricarboxylic, hemimellitic, trimerized vegetable oil acids (predominantly trimers of unsaturated $C_{18}$ fatty acids).

Tetracarboxylic acids: pyromellitic, naphthalene tetracarboxylic, hydrogenated naphthalene tetracarboxylic.

Pentacarboxylic acids: benzene pentacarboxylic acid.

Hexacarboxylic acids: mellitic acid.

Miscellaneous other suitable polycarboxylic acids include maleic-modified rosin acids, and maleic-modified tall oil acids.

When the ester is derived from an unsaturated aliphatic acid having an activated double bond, such as maleic, an additional hydroxy-substituted dioxolane group can become attached at the double bond via addition of hydroxyl across the double bond. Thus, maleic acid can yield the diester of the corresponding oxysuccinate. Addition across the double bond can be prevented or minimized by using an alkyl orthotitanate as the esterification catalyst.

In the preparation of esters, the acid moiety need not be carboxylic. Amphoteric compounds and radicals and other compounds and radicals which can act as acids are useful in preparing the esters of this invention, for example cyanuric acid and ortho esters of acids of silicon, titanium, aluminum, boron, phosphorus and the like. Urethane linkages, for example as derived from polyisocyanates, are also useful in connecting a plurality of vinyl dioxolane radicals. Suitable linkages also include a single ether oxygen atom and a plurality of ether oxygen atoms associated with, for example, hydrocarbon radicals as set forth in certain of the radicals listed above. The illustrative working examples provided hereinafter will describe typical procedures for preparing compounds which depend on such linkages to join a plurality of vinyl dioxolane groups.

It is to be understood that mixtures of reactants of the same general class can be used in place of a single reactant of that class in the process described above. For example, mixtures of suitable polyhydric alcohols and/or mixtures of suitable homologs of acrolein can be used in preparing the vinyl dioxolane moiety. Likewise, in the ester preparations, mixtures of suitable acid moieties and/or suitable vinyl dioxolane moieties can be used. Furthermore, when products are made from either one or more species of the different classes of reactants, the resulting single or mixed reaction products can be blended with each other to yield mixed compositions having desirable characteristics of the separate components.

The preferred new compounds of this invention are the liquid ones because these lend themselves to the easy preparation of solvent-free liquid end products, a type especially desirable because the cost and fire hazard of solvents are eliminated. However, the new compounds which are highly viscous or solid are readily soluble in common solvents and can be used in solution form.

Suitable solvents include aliphatic and aromatic liquid hydrocarbons, esters, ketones, alcohols and mixtures thereof.

The new compounds can be used as clear, unpigmented coating compositions, with solvent if required for convenience of application, or they can be pigmented, using proportions well known in the art, with pigments commonly used in the coating art, such as metal oxides, sulfides, sulfates, silicates, chromates, iron blues, organic colors, and metal flake pigments. As is the case with other air-drying materials, some pigments inhibit drying. These are to be avoided in coating compositions formulated to dry at ordinary temperatures, but they can be used if the coatings can be force-dried or baked.

The new compounds, individually or mixed, can be the sole organic film-forming component of coating compositions, or they can be blended with other well known film-formers such as vegetable oils, oil-modified alkyd resins, oleoresinous varnishes, alkylated urea aldehyde resins, alkylated melamine aldehyde resins, polyepoxy-polyhydroxy resins, phenol aldehyde resins, cellulose acetate, cellulose acetate butyrate, polymers, and copolymers of vinyl and vinylidene compounds such as vinyl chloride, vinylidene chloride, vinyl acetate, acrylic and methacrylic acid and the esters thereof, styrene, butadiene, and the like; elastomers such as neoprene, styrene-butadiene rubbers, acrylonitrile-butadiene rubbers and isobutylene-isoprene rubbers; polyurethanes, and silicones.

Other common ingredients of organic film-forming compositions can be used in the manner and in proportions well known in the art. These include plasticizers, catalysts, hardeners, anti-skinning agents and surface active agents. Particularly included in this class of additives are metallic driers, i.e. the commonly used naphthenate, linoleate, resinate, tallate, octoate (2-ethyl hexoate) or other salts or soaps of siccative metals such as cobalt, lead, iron, manganese, zinc, calcium, nickel and copper. Such driers are commonly used in the art to speed up the drying and ultimate insolubilization of air-drying compositions, and they have a similar effect on the new compounds and compositions of this invention. Thus, compositions derived from the new compounds preferably contain one or more of such driers. A particularly preferred drier metal is cobalt. The proportion of drier is usually within the range of 0.0005%–3% of metal (in the drier) based on the weight of organic film-forming material.

It is well known that the drying speed of air-drying compositions can be increased not only by adding drier but also by heating, or a combination thereof. The drying, polymerization or insolubilization of compositions containing the new compounds of this invention can likewise be hastened. Temperatures moderately above room-temperature, e.g. 100°–150° F., usually hasten drying enough but, where desirable, the compositions can be baked at higher temperatures e.g. 200°–400° F. for short periods.

The polymerized compositions are homopolymers or copolymers of the individual compounds or the mixtures thereof used. Due to their insolubility, they are considered to be highly cross-linked. While the new compounds are most useful in substantially monomeric form, they can be homopolymerized, or copolymerized with other vinyl monomers. Usually a low degree of polymerization is preferred since in this condition the compositions can be applied as coatings which dry in air to an insoluble state by further polymerization.

The utility of the new compounds and the new compositions of this invention is not limited to coatings, although this is a preferred use. Specific coating uses include the painting of structural steel (particularly rusty steel or steel having mill scale on the surface), automobiles, refrigerators, washing machines, furniture, office equipment, partitions and other industrial products. Some of the new compounds and new compositions are particularly useful where the coated article is subsequently formed into a final product as in the case of cans, venetian blinds, siding for buildings and screws caps for containers. Further coating uses include architectural paints and enamels, paper and fabric coatings, and electrical insulation. Other uses include calks and putties, molding and casting resins, modifiers and matrixes for polymers, ingredients in copolymers, chemical intermediates, fiber treatments and modifiers, impregnants for fabrics and papers, adhesives and bonding agents, unsupported sheeting, and stencilling and printing inks for paper, textiles, linoleum, containers and the like.

The following examples are provided to illustrate the principles and practice of this invention, but it is not limited by the specific embodiments illustrated. Parts and percentages are given by weight unless otherwise specified.

EXAMPLE 1

*Preparation of 4-hydroxybutyl-2-vinyl-1,3-dioxolane*

A three liter, three-necked flask equipped with a thermometer, a stirrer and a continuous water separator was charged with 670 g. (5 mols) of 1,2,6-hexanetriol, 280 g. (5 mols) of acrolein containing a trace of hydroquinone inhibitor, 375 g. of hexane, 5 g. of oxalic acid and 5 g. of hydroquinone. The mixture was refluxed (50°–67° C.) with continuous removal of water for 24 hrs. (116 ml. removed). The mixture was freed of hexane and acrolein by heating to 60° C. and gradually reducing the pressure to less than 1 mm. Hg. Vacuum distillation (106°–122° C./1–3 mm. Hg.) of 876 g. of residue gave 642 g. of water-white oil and 225 g. of tan resin. The oil was dissolved in 650 g. of benzene, washed once with 300 ml. of 5% sodium hydroxide, once with 320 ml. of 5% sodium chloride and once with 200 ml. of 0.5% sodium bicarbonate. The organic phase was dried over anhydrous magnesium sulfate, filtered and substantially freed of benzene at reduced pressure. After heating 30 min. at 50°–60° C./1 mm., 582 g. of 4-hydroxybutyl-2-vinyl-1,3-dioxolane, more specifically 4-(4'-hydroxybutyl)-2-vinyl-1,3-dioxolane, were obtained.

*Preparation of isophthalic acid diester*

A three liter, three-necked flask equipped with a thermometer, a stirrer, nitrogen inlet and an 18-inch helix-packed column topped with a total reflux head was charged with 194 g. (1 mol) of dimethyl isophthalate, 413 g. (2.4 mols) of 4-hydroxybutyl-2-vinyl-1,3-dioxolane and 260 g. of toluene. The system was purged with nitrogen, and about 86 g. of toluene were distilled off to dry the reaction mixture and the apparatus. After cooling to about 30° C., 3 g. of sodium methoxide was added, and the mixture was heated to reflux (about 95° C.). Toluene-methanol binary was distilled off during the ensuing 2.5 hours. A total of 125 ml. of distillate were collected. At this point, the charge temperature was 144° C. and the vapor temperature was 109° C. The charge was cooled to room temperature and dissolved in a mixture of 220 g. of benzene and 300 g. of hexane. The resulting solution was washed four times with 200 g. portions of water, and the organic phase was separated and dried over anhydrous magnesium sulfate. After filtering, the mixture was substantially freed of solvent and unreacted 4-hydroxy-butyl-2-vinyl-1,3-dioxolane by successively heating at about 60° C., then about 150° C., at about 1 mm. Hg 461 g. of liquid pale yellow isophthalic acid diester of 4-hydroxy-butyl-2-vinyl-1,3-dioxolane were obtained.

In relating this compound to the previously described structural formula and radicals, it is seen that the monovalent substituents satisfying the remaining valences of the first-given structural formula of this specification are all hydrogen, R is hydrogen, and the whole connecting moiety between two dioxolane rings is

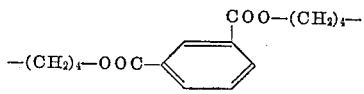

in which each terminal —(CH₂)₄— chain acts as a bridge between a dioxolane ring and the divalent connecting radical —OOCC₆H₄COO—.

EXAMPLE 2

*Preparation of sebacic acid diester of 4-hydroxylbutyl-2-vinyl-1,3-dioxolane*

The apparatus was the same as that used in the ester preparation of Example 1. Charged thereto were 115 g. (0.5 mol) of dimethyl sebacate, 206 g. (1.2 mols) of 4-hydroxybutyl-2-vinyl-1,3-dioxolane, 130 g. of toluene and 1 g. of sodium carbonate. About 43 g. of toluene were distilled off to dry the reaction mixture and the apparatus. After cooling to about room temperature, 1 g. of sodium methoxide was added, and the mixture was heated to reflux (about 125° C.) Toluene-methanol binary was distilled off during the ensuing 3 hours. A total of 64 ml. of distillate were collected. At this point the charge temperature was 154° C. and the vapor temperature was 109° C. The charge was cooled to room temperaure and was dissolved in a mixture of 88 g. of benzene and 100 g. of hexane. The resulting solution was washed six times with 100 g. portions of water, and the organic phase was separated and dried over anhydrous magnesium sulfate. After filtering, the mixture was substantially freed of solvent and unreacted 4-hydroxy-butyl-2-vinyl-1,3-dioxolane by successively heating at about 60° C., then about 150° C., at about 1 mm. Hg 222 g. of liquid yellow sebacic acid diester of 4-hydroxybutyl-2-vinyl-1,3-dioxolane were obtained.

The structure of this compound differs from that of Example 1 only in the connecting radical, which here is —OOC(CH₂)₈COO—.

EXAMPLE 3

*Preparation of adipic acid diester of 4-hydroxybutyl-2-vinyl-1,3-dioxolane*

A half-liter, three-necked flask equipped with a thermometer, a stirrer, a dropping funnel and a reflux condenser was charged with 50 g. of diethyl ether, 27.4 g. (0.15 mol) of adipyl chloride and 31.6 g. (0.4 mol) of pyridine. The mixture was cooled to about 10° C. in an ice bath, and 56.7 g. (0.33 mol) of 4-hydroxybutyl-2-vinyl-1,3-dioxolane dissolved in 50 g. of diethyl ether were added dropwise at such a rate that the charge temperature did not exceed 20° C. The mixture was then allowed to warm to room temperature and was heated for six hours at reflux (about 41° C.). The reaction mixture was cooled and was washed in a separatory funnel with 50 ml. of water and 50 ml. of diethyl ether. The organic phase was retained and was successively washed three times with 50 ml. portions of water, once with 50 ml. of 10% sodium hydroxide, and finally twice with 50 ml. portions of water. It was dried over anhydrous magnesium sulfate, filtered and substantially freed of solvent and unreacted 4-hydroxybutyl-2-vinyl-1,3-dioxolane by successively heating at about 60° C., then about 150° C., at about 1 mm. Hg 64 g. of liquid yellow adipic acid diester of 4-hydroxybutyl-2-vinyl-1,3-dioxolane were obtained.

The structure of this compound differs from that of Example 1 only in the connecting radical, which here is —OOC(CH₂)₄COO—.

EXAMPLE 4

*Preparation of maleic acid diester of 4-hydroxybutyl-2-vinyl-1,3-dioxolane*

43 parts of diethyl maleate, 89.4 parts of 4-hydroxybutyl-2-vinyl-1,3-dioxolane, and 175 parts of toluene together with 3 parts of tetraisopropyl titanate were refluxed at about 77° C. for about 4 hours. Finally, 200 parts of toluene were added to the reaction mixture, then the mixture was washed with water, dried with calcium sulfate, filtered and heated under a pressure of about 20 mm. of mercury absolute to strip off the low boiling materials. About an 85% yield of diester product having a viscosity of about 1.46 poises at 25° C. was obtained by fractionation at a temperature of about 150° C. under a pressure of about 1 mm. of mercury absolute. Other alkyl orthotitanates, as described above, can be substituted for the isopropyl homolog used in this example with substantially equal results.

The connecting radical in this compound is —OOCCH=CHCOO—. Otherwise the structure is as described in Example 1.

EXAMPLE 5

*Preparation of acetonedicarboxylic acid diester of 4-hydroxybutyl-2-vinyl-1,3-dioxolane*

80 parts of diethyl acetone dicarboxylate, 145 parts of 4-hydroxybutyl-2-vinyl-1,3-dioxolane, 75 parts of toluene, and 3 parts of tetraisopropyl titanate were refluxed for 3 hours at about 74° to 76° C. Another 3 parts of catalyst were added and heating was continued for an additional 3 hours. The reaction mixture was then washed and fractionated as described in the preceding example. An 89% yield of diester product was obtained.

The connecting radical is —OOCCH₂COCH₂COO—. Otherwise the structure is as described in Example 1.

EXAMPLES 6–13

The following polycarboxylic acid esters of 4-hydroxybutyl-2-vinyl-1,3-dioxolane (Examples 6–13) were prepared by the general procedures outlined in the foregoing examples and discussion. The structural formulas are apparent from the foregoing discussion.

*Example 6.*—Orthophathalic diester from 49.5 parts of dimethylorthophthalate, 86.1 parts of the dioxolane, and 6 parts of sodium methoxide in 60 parts of toluene.

*Example 7.*—Terephthalic diester from 97 parts of dimethylterephthalate, 189 parts of the dioxolane and 1.5 parts of sodium methoxide in 130 parts of toluene.

*Example 8.*—Pyromellitic tetraester from 55 parts of tetramethyl pyromellitate, 134 parts of the dioxolane, and 1.2 parts of sodium methoxide in 100 parts of toluene.

*Example 9.*—Tetrahydronaphthalene-1,2,6,7-tetraester from 50 parts of tetrahydronaphthalene tetramethylcarboxylate, 106 parts of the dioxolane and 1 part of sodium methoxide in 125 parts of toluene.

*Example 10.*—(2 - vinyl-1,3-dioxolan-4-yl)butoxysuccinic diester from 74 parts of diethyl maleate, 230 parts of the dioxolane and 0.25 parts of metallic sodium in 175 parts of benzene.

*Example 11.*—Thiodipropionic diester from 51.5 parts of dimethyl-beta-thiodipropionate, 94.8 parts of the dioxolane and 1.5 parts of sodium methoxide in 350 parts of toluene.

*Example 12.*—Trimerized 18-carbon atom vegetable oil acid triester from 100.8 parts of the tributyl ester of the trimerized acid (Emery Industries Product No. 3055S), 55 parts of the dioxolane, and 1.5 parts of sodium methoxide in 175 parts of xylene.

*Example 13.*—Itaconic diester from 39.5 parts of dimethyl itaconate, 89.4 parts of the dioxolane, 3 parts of tetraisopropyl titanate and 0.2 parts of hydroquinone polymerization inhibitor in 175 parts of toluene.

EXAMPLES 14–19

The following Examples 14–19 illustrate polycarboxylic acid esters of 4-hydroxymethyl-2-vinyl-1,3-dioxolane. The dioxolane was prepared from glycerine and acrolein by the general procedure described in Example 1. The common characteristic which distinguishes the structure of the esters of this group of examples from the esters of Examples 1–13 is the presence of a single —CH₂— group in place of —(CH₂)₄— as the bridge.

*Example 14.*—Adipic diester from 87 parts of dimethyl adipate, 136.5 parts of the dioxolane and 1.5 parts of sodium methoxide in 175 parts of toluene.

*Example 15.*—Azelaic diester from 100 parts of azelaic acid and 150 parts of the dioxolane in 200 parts of xylene (8.5 hours at 170°–205° C.).

*Example 16.*—Diglycolic diester from 40.5 parts of dimethyl diglycolate, 78 parts of the dioxolane and 1 part of sodium methoxide in 50 parts of toluene.

*Example 17.*—Homocyclopentane tetraester from 39.3 parts of homocyclopentane tetramethyl carboxylate, 70.2 parts of the dioxolane and 2 parts of sodium methoxide in 175 parts of toluene.

*Example 18.*—Dimerized 18 carbon atom vegetable oil acid diester from 71.2 parts of the dibutyl ester of the dimerized acid ("Empol" 1022, Emery Industries), 28.6 parts of the dioxolane, and 1.5 parts of sodium methoxide in 140 parts of xylene.

*Example 19.*—Orthophthalic diester from 38.8 parts of dimethyl orthophthalate, 57.2 parts of the dioxolane, and 2 parts of sodium methoxide in 125 parts of toluene.

EXAMPLES 20–40

The following Examples 20–40 illustrate additional esters of this invention some of which are esters of a polyhydric alcohol and a monocarboxylic acid moiety which contains at least one dioxolane radical.

*Example 20.*—The diester having the following structural formula

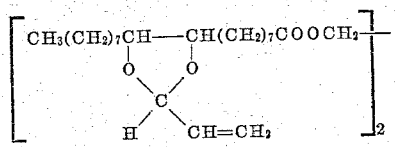

which is ethylene bis(2-vinyl-4-octyl-1,3-dioxolan-5-yl) octoate, from 73.6 parts of

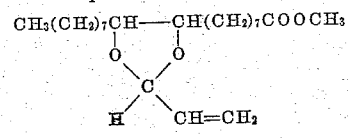

(the equimolar condensate of acrolein and epoxidized methyl oleate in the presence of ammonium chloride), 9.3 parts of ethylene glycol and 1.5 parts of sodium methoxide in 125 parts of toluene.

In relating this compound to the previously described structural formula and radicals, it is seen that the monovalent substituents satisfying the remaining valences of the first-given structural formula of this specification are two hydrogen atoms and one octyl radical, R is hydrogen, and the whole connecting moiety between two dioxolane rings is —(CH₂)₇COOCH₂CH₂OOC(CH₂)₇— in which each terminal —(CH₂)₇CO— radical acts as a bridge between a dioxolane ring and the divalent connecting radical —OCH₂CH₂O—.

Using as a guide the relations described in this example and preceding examples between the structure of the compounds prepared therein and the structural requirements of this invention, the corresponding relations can be determined in the succeeding examples merely by examining the structural formulas of the compounds disclosed.

*Example 22.*—The bis-carbonate from 206 parts of 2-vinyl-4-(para-hydroxybenzyl)-1,3-dioxolane and 50 parts of phosgene in the presence of 100 parts of pyridine and 500 parts of diethyl ether. The phosgene is introduced slowly into a mixture of the other ingredients at about 0° C.

*Example 23.*—The orthophthalic acid diester from 244 parts of 2-vinyl-4-phenyl-5-hydroxybutyl-1,3-dioxolane and 97 parts of dimethyl orthophthalate in the presence of 2 parts of sodium methoxide and 200 parts of toluene.

*Example 24.*—The adipic acid diester from 212 parts of 2 - vinyl-4-[(4'-hydroxycyclohexyl)methyl]-1,3-dioxolane and 87 parts of dimethyl adipate in the presence of 2 parts of sodium methoxide and 200 parts of toluene.

*Example 25.*—The phosphoric acid triester from the addition of 51 parts of phosphorus oxychloride in 100 parts of diethyl ether to 172 parts of 2-vinyl-4-hydroxybutyl-1,3-dioxolane in 100 parts of pyridine and 100 parts of diethyl ether at a temperature of about 10° C.

*Example 26.*—The benzene phosphonic acid diester from the addition of 96 parts of benzene phosphorusoxydichloride in 150 parts of diethyl ether to 172 parts of 2-vinyl-4-hydroxybutyl-1,3-dioxolane in 100 parts of pyridine and 100 parts of diethyl ether at a temperature of about 10° C.

*Example 27.*—The tetraester from 254 parts of 2-vinyl-4-omegacarbomethoxyoctyl-1,3-dioxolane, i.e. the equimolar condensate of acrolein and epoxidized methyl undecylenate, and 34 parts of pentaerythritol in the presence of 2 parts of sodium methoxide and 200 parts of toluene.

*Example 28.*—The tetraester from 234 parts of 2-vinyl-4-phenyl-5-hydroxypropyl - 1,3 - dioxolane, i.e. the equimolar condensate of acrolein and 1-phenyl-1,2,5-trihydroxypentane, and 52 parts of tetraethyl orthosilicate in 200 parts of toluene.

*Example 29.*—The hexaester from 180 parts of 2-vinyl-4-hydroxybutyl-1,3-dioxolane and 71 parts of hexamethyl mellitate in the presence of 2 parts of sodium methoxide and 150 parts of toluene.

In the following Examples 30–40 of esters of this invention the substituted dioxolanes used are the equimolar condensates of acrolein and a particular glycidic ester which provides the substituents indicated. The condensation reactions are carried out by the general procedure illustrated in Example 30.

*Example 30.* — 2-vinyl-4-(n-heptyl)-4-methyl-5-carbomethoxy-1,3-dioxolane is prepared from equimolar proportions of acrolein (56 parts) and beta-methyl beta-n-heptyl glycidic acid methyl ester

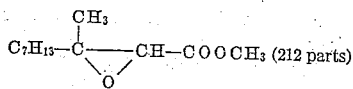 (212 parts)

by refluxing at about 80° C. for six hours in the presence of an approximately equal weight of benzene (300 parts) and about 0.1% of boron trifluoride (0.3 part).

A diester is prepared by the general method of the second part of Example 1 from 268 parts of the dioxolane and 23 parts of 1,4-butanediol in the presence of 200 parts of benzene and 2 parts of sodium methoxide.

The ester preparation of Example 30 is repeated using in place of the dioxolane used therein:

*Example 31.*—2-vinyl-4-(para-tolyl)-5 - carbomethoxy-1,3-dioxolane, 247 parts.

*Example 32.*—2-vinyl-4-(beta-chloroethyl)-4-methyl-5-carbomethoxy-1,3-dioxolane, 234 parts.

*Example 33.*—2-vinyl-4-(4',4',4'-trifluorobutyl)-5 - carbomethoxy-1,3-dioxolane, 282 parts.

*Example 34.*—2-vinyl-4-(beta - chloroethoxyethyl) - 5-carbomethoxy-1,3-dioxolane, 265 parts.

*Example 36.*—A triester is prepared by the general method of the second part of Example 1 from 262 parts of 2-vinyl-4-(beta-fluoroethoxyethyl)-5'- carbethoxy - 1,3-dioxolane and 40 parts of trimethylolethane in the presence of 200 parts of benzene and 2 parts of sodium methoxide.

The ester preparation of Example 36 is repeated using in place of the dioxolane used therein:

*Example 37.*—2-vinyl-4-(beta - cyanoethoxyethyl) - 5-carbethoxy-1,3-dioxolane, 269 parts.

*Example 38.*—2-vinyl-4-(beta - n - butoxyethyl)-5-carbethoxy-1,3-dioxolane, 272 parts.

*Example 39.*—2-vinyl-4-(9'-decenyl)-5-carbethoxy-1,3-dioxolane, 310 parts.

*Example 40.*—2 - vinyl-4-(omega - cyanopropyl)-5-carbethoxy-1,3-dioxolane, 239 parts.

EXAMPLES 41–53

The following Examples 41–53 illustrate new compounds of this invention other than carboxylate esters.

*Example 41.*—The tricyanurate from 24.9 parts of triallylcyanurate, 51.6 parts of 4-hydroxybutyl-2-vinyl-1,3-dioxolane, and 2 parts of sodium methoxide in 200 parts of toluene at 80°–110° C. by the general procedure used in the esterification step of Examples 1, 2, 4 and 5.

*Example 42.*—The diurethane from 34.8 parts of tolylene diisocyanate and 37.8 parts of 4-hydroxybutyl-2-vinyl-1,3-dioxolane. The diisocyanate is added dropwise at 20°–65° C.

*Example 43.*—The triorthoformate from 29.6 parts of triethyl orthoformate and 78 parts of 4-hydroxybutyl-2-vinyl-1,3-dioxolane in 125 parts of toluene at 60°–110° C. by the general procedure used in the esterification step of Examples 1, 2, 4 and 5.

*Example 44.*—The diether of 4-hydroxymethyl-2-vinyl-1,3-dioxolane from 166.2 parts of diglycerol, 112.1 parts of acrolein and 2 parts of ammonium chloride in 125 parts of benzene at 75°–90° C. by the general procedure used in the first part (hydroxy-dioxolane preparation) of Example 1.

*Example 45.*—The triorthoaluminate from 20.4 parts of aluminum triisopropoxide and 51.6 parts of 4-hydroxybutyl-2-vinyl-1,3-dioxolane in 125 parts of toluene at 80°–110° C. by the general procedure used in the esterification step of Examples 1, 2, 4 and 5.

*Example 46.*—The diorthotitanate from 71 parts of titanium tetraisopropoxide and 90.3 parts of 4-hydroxybutyl-2-vinyl-1,3-dioxolane at 80°–140° C. by the general procedure used in the esterification step of Examples 1, 2, 4 and 5. In this compound the remaining two valences of the titanium are satisfied by isopropoxide radicals.

*Example 47.*—The diphenylol propane diether from 376 parts of diphenylol propane diglycidyl ether, 112 parts of acrolein and 3 parts of ammonium chloride in 200 parts of toluene at 70°–90° C. by the general procedure used in the first part (hydroxy-dioxolane preparation) of Example 1.

*Example 50.*—The diether from 218 parts of 2-vinyl-4-(beta-hydroxyethoxyethoxy methyl)-1,3-dioxolane and 74 parts of the dimethyl ether of dimethylol urea heated at reflux temperature in 200 parts of toluene.

*Example 52.*—The disiloxane from 123 parts of symmetrical diglycidyl tetramethyl disiloxane and 56 parts of acrolein refluxed in the presence of 0.2 part of boron trifluoride and 200 parts of diethyl ether.

*Example 53.*—The disiloxane from 139 parts of symmetrical tetramethyl diglycidyloxydisiloxane and 56 parts of acrolein refluxed in the presence of 0.2 part of boron-trifluoride and 200 parts of diethyl ether.

EXAMPLES 54–66

The following Examples 54–66 illustrate additional compounds of this invention having alpha-substituents other than hydrogen in the 2-vinyl group. The products have the characteristic, which is common to the new compounds of this invention, of polymerizing in the presence of oxygen.

The procedure of Example 1 is repeated using the indicated amounts of alpha-substituted acroleins in place of the unsubstituted acrolein used in that example. The substituent thus placed in the 2-position is indicated beside the example number.

*Example 54.*—Isopropenyl. Alpha-methacrolein, 350 grams.

*Example 55.*—Alpha - acetoxyvinyl. Alpha-acetoxy-acrolein, 490 grams.

*Example 57.*—Alphachlorovinyl. Alphachloroacrolein, 450 grams.

*Example 58.*—Alphacyanovinyl. Alphacyanoacrolein, 405 grams.

*Example 59.*—Alphacarbomethoxyvinyl. Alphacarbomethoxy acrolein, 570 grams.

*Example 60.*—Alphafluorovinyl. Alphafluoroacrolein, 370 grams.

*Example 62.* — Alpha (omega - chloropropyl)vinyl. Alpha(omega-chloropropyl)acrolein, 660 grams.

*Example 63.*—Alpha(cyanoethyl)vinyl. Alpha(cyanoethyl)acrolein, 535 grams.

*Example 65.*—Alphaethoxyvinyl. Alphaethoxyacrolein, 500 grams.

*Example 66.*—Alphafluoroethylvinyl. Alphafluoroethylacrolein, 510 grams.

The new compounds of the foregoing examples all become substantially insoluble in solvent for the original material when 0.05% of cobalt (in the form of a 10% solution of cobalt octoate) is uniformly admixed therewith, the resulting mixture is drawn or flowed as a film about 2 mils thick on glass and primed steel test panels and the thus-coated panels are permitted to stand in air at room temperature (65°–80° F.). The products of Examples 11, 18 and 42 were force-dried at 150° F. Random samples taken during this drying, polymerizing or insolubilizing stage all showed, by chemical and infra red analysis, that as oxygen was absorbed acrylic ester and hydroxyl structures progressively appeared and the dioxolane ring (cyclic acetal) structure and vinyl unsaturation progressively disappeared. All of the coatings are adherent and flexible. All show outdoor durability characteristics generally equal or superior to linseed oil and drying oil-modified alkyd resin coatings.

EXAMPLES 68–71

The following Examples 68–71 illustrate pigmented and clear coating compositions of this invention in which a new vinyl dioxolane compound of this invention can be the only organic film-forming material or can be used in admixture with any desirable proportion of other organic film-forming material—from a minute proportion, i.e. less than 1%, to substantially the whole amount of film-former, i.e. more than 99%.

*Example 68.*—Three paints are prepared by separately grinding in conventional paint grinding apparatus 100 parts each of (a) the ester of Example 1, (b) the ester of Example 4, and (c) a mixture of equal parts of these, with 50 parts of titanium dioxide pigment. To the resulting smooth dispersions are added 0.05 part of cobalt as cobalt octoate to minimize drying time. Coatings brushed on wood and metal panels dry tack-free in about 10 hours. The dry coatings are glossy, flexible, adherent, and durable.

These paints have the unique characteristic of being free of solvent, yet they are sufficiently liquid to allow easy application by brushing. For convenient spraying, solvent is required to thin them.

*Example 69.*—A paint particularly suitable for protecting exterior wood surfaces, such as on houses, is prepared by grinding 25 parts of titanium dioxide and 25 parts of asbestine extender in a mixture of 30 parts of linseed oil and 70 parts of the ester of Example 19. Drier is added in the amount of 0.1 part of cobalt in the form of cobalt octoate.

A coating of this paint dries faster than an analogous product containing none of the new ester of this invention.

*Example 70.*—A black baking enamel is prepared by grinding 5 parts of carbon black pigment in 120 parts of a 50% solution of a 37% coconut oil modified alkyd resin in toluene. To the resulting smooth dispersion are added 60 parts of a 50% solution of butylated urea formaldehyde resin in butanol, 10 parts of the product of Example 6 and 0.02 part of cobalt in the form of cobalt octoate. This product, when diluted, sprayed on primed metal and baked for 30 minutes at 280° F. yields a durable, adherent, and protective coating.

*Example 71.*—A clear varnish is prepared by dissolving 100 parts of ester gum in 300 parts of the product of Example 15 at 250° F. under a blanket of carbon dioxide, diluting the mixture with 300 parts of mineral spirits and adding 0.15 part of cobalt as cobalt octoate. A thin film of this product brushed out on wood dries to a hard, glossy coating.

Coating compositions containing the new compounds of this invention are useful for the protection and/or decoration of structures and articles made of metal, wood, ceramics, glass, woven and non-woven fabrics, fibers, plaster, concrete, asbestos, wire and the like. Many varieties of bare wood contain substances which inhibit the drying of coatings containing the new compounds of this invention. Hence, when using wood, it is usually desirable to apply and dry a first or priming coat of a different composition. Primers and undercoats can also be used, if desired, on other kinds of substrates. Also, coating compositions of this invention can be used as primers or undercoats, with subsequent coatings of the same, similar, or different compositions applied thereover.

EXAMPLES 72 AND 73

The following Examples 72 and 73 illustrate polymers of the new compounds of this invention prepared by effecting polymerization by normal vinyl addition polymerization techniques, in contrast with the oxygen-effected mechanism previously described.

*Example 72.*—25 parts of the product of Example 2 are polymerized with 75 parts of styrene monomer in the presence of 1.5 parts of azobisisobutyronitrile and 100 parts of xylene under a nitrogen atmosphere at about 70° C. for 18 hours.

*Example 73.*—Example 72 is repeated, except for substituting methyl methacrylate monomer for styrene monomer.

The styrene and methyl methacrylate used in the two examples directly above merely illustrate the ethylenically unsaturated compounds with which the new vinyl compounds of this invention form copolymers. Others are acrylic, methacrylic, and maleic acid and esters of these acids, butadiene, acrylonitrile, vinyl chloride, vinylidene chloride, vinyl acetate and the like. The proportion of the new compound used in such copolymers can be from a minute proportion, e.g. less than 1%, to almost the entire mixture of monomers copolymerized, e.g. over 99%, as the desired properties dictate. Since the new compounds are polyfunctional they are believed to act as cross-linking agents. The polymerization can be carried out in bulk or in aqueous or organic media and is preferably conducted in the presence of a catalytic proportion of an organic peroxide, azo compound, per-salt or other vinyl polymerization initiator.

Such copolymers are useful in coatings, in molding and casting resins and in many of the other uses set forth hereinbefore.

Many widely different embodiments of this invention can be made, in the light of the teachings herein, in addition to those described in the specific examples. The invention is not intended to be limited except as indicated in the appended claims.

I claim:
1. Liquid compounds containing two to six, inclusive, cyclic radicals having the following structural formula.

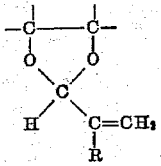

in which 3 of the 4 remaining valences are satisfied by monovalent radicals of the class consisting of hydrogen, alkyl, aryl, alkaryl, chloroalkyl, fluoroalkyl, alkoxyalkyl, chloroalkoxyalkyl, fluoroalkoxyalkyl, cyanoalkoxyalkyl, cyanoalkyl, and alkenyl, the fourth valence connects the cyclic radical to at least one other such cyclic radical through an interposed polyvalent radical, and R is a monovalent radical of the class consisting of hydrogen, alkyl, chloro, fluoro, cyano, acyloxy, chloroalkyl, fluoroalkyl, cyanoalkyl, alkoxy, and carbalkoxy, said interposed polyvalent radical containing in the chain of atoms directly connecting said cyclic radicals at least two different atoms at least one of which is carbon, said interposed polyvalent radical being free of substituents having an inhibiting effect on the air-drying property of said compounds.

2. A compound of claim 1 in which R is hydrogen.
3. A compound of claim 1 in which R is methyl.
4. A compound of claim 1 in which R is cyano.
5. A compound of claim 1 in which all substituents on said interposed polyvalent radical are selected from the class consisting of hydrogen and hydrocarbon radicals.
6. A compound of claim 1 which is an ester of a polycarboxylic acid.
7. A compound of claim 6 in which said interposed polyvalent radical contains, in addition to the oxygen atoms of carboxylate groups, only carbon and hydrogen atoms.
8. A compound of claim 1 which is an ester of a dicarboxylic acid.

9. A compound of claim 1 which is an ester of a polycarboxylic acid containing polymerizable unsaturation.

10. A compound of claim 1 which is an ester of a polyhydric alcohol and a monocarboxylic acid moiety, said moiety containing at least one radical defined by the structural formula of claim 1.

11. A compound of claim 1 which is an ester of an amphoteric moiety.

12. A compound of claim 1 in which said interposed polyvalent radical comprises ether oxygen.

13. A composition comprising at least one compound of claim 1 and drier selected from the class consisting of soaps and salts of siccative metals.

14. A process for preparing an ester of a hydroxy-2-alkenyl-1,3-dioxolane and a polycarboxylic acid which comprises heating a mixture of said dioxolane and a lower alkyl ester of said polycarboxylic acid and removing the lower alkanol produced in the reaction.

15. A catalytic process which comprises reacting a hydroxy-2-alkenyl-1,3-dioxolane with a polycarboxylic acid ester in the presence of an alkyl orthotitanate.

16. A catalytic process which comprises reacting a hydroxy-2-alkenyl-1,3-dioxolane with a polycarboxylic acid ester at a temperature of about 50° to 150° C. in the presence of 5 to 20 parts by weight per mole of said dioxolane of an alkyl orthotitanate having the formula $Ti(OR)_4$ wherein R represents an alkyl radical containing 1 to 6 carbon atoms.

17. The diether of 4-hydroxymethyl-2-vinyl-1,3-dioxolane.

18. The orthophthalic acid diester of 4-hydroxybutyl-2-vinyl-1,3-dioxolane.

19. The itaconic acid diester of 4-hydroxybutyl-2-vinyl-1,3-dioxolane.

20. The maleic acid diester of 4-hydroxybutyl-2-vinyl-1,3-dioxolane.

21. The sebacic acid diester of 4-hydroxymethyl-2-vinyl-1,3-dioxolane.

References Cited in the file of this patent

UNITED STATES PATENTS

| | | |
|---|---|---|
| 1,860,098 | Jaeger | May 24, 1932 |
| 2,441,470 | Carswell | May 11, 1948 |
| 2,578,861 | Thomas et al. | Dec. 18, 1951 |
| 2,660,563 | Banes | Nov. 24, 1953 |
| 2,729,650 | Habeshaw et al. | Jan. 3, 1956 |
| 2,895,945 | Fischer | July 21, 1959 |
| 2,902,476 | Kern et al. | Sept. 1, 1959 |

FOREIGN PATENTS

| | | |
|---|---|---|
| 757,573 | Great Britain | Sept. 19, 1956 |
| 1,111,189 | France | Oct. 26, 1955 |

OTHER REFERENCES

Hilbert: Jour. Amer. Chem. Soc., vol. 51, pp. 3115–3123, October 1929.

UNITED STATES PATENT OFFICE
CERTIFICATE OF CORRECTION

Patent No. 3,010,923            November 28, 1961

Carol K. Ikeda

It is hereby certified that error appears in the above numbered patent requiring correction and that the said Letters Patent should read as corrected below.

Column 4, line 72, for "sreve" read -- serve --; column 18, list of references cited, under FOREIGN PATENTS, add the following:

717,418     Great Britain ---------- Oct. 27, 1954

Signed and sealed this 10th day of April 1962.

(SEAL)
Attest:

ERNEST W. SWIDER            DAVID L. LADD

Attesting Officer            Commissioner of Patents